(12) United States Patent
Duerbaum et al.

(10) Patent No.: US 7,298,197 B2
(45) Date of Patent: Nov. 20, 2007

(54) MULTI-PHASE DC-DC CONVERTER WITH SHARED CONTROL

(75) Inventors: Thomas Duerbaum, Baiersdorf (DE); Reinhold Elferich, Aachen (DE); Tobias Tolle, Aachen (DE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 10/568,903

(22) PCT Filed: Aug. 5, 2004

(86) PCT No.: PCT/IB2004/051401

§ 371 (c)(1),
(2), (4) Date: Feb. 16, 2006

(87) PCT Pub. No.: WO2005/018069

PCT Pub. Date: Feb. 24, 2005

(65) Prior Publication Data

US 2006/0209579 A1   Sep. 21, 2006

(30) Foreign Application Priority Data

Aug. 18, 2003 (EP) ................................. 03102567

(51) Int. Cl.
*H02J 1/00* (2006.01)
(52) U.S. Cl. ........................ 327/416; 307/82
(58) Field of Classification Search ................ 327/416; 323/272; 307/82
See application file for complete search history.

(56) References Cited

U.S. PATENT DOCUMENTS

| | | | | |
|---|---|---|---|---|
| 6,278,263 | B1 * | 8/2001 | Walters et al. | 323/272 |
| 6,281,666 | B1 * | 8/2001 | Tressler et al. | 323/272 |
| 6,381,155 | B1 | 4/2002 | Kadatsky et al. | |
| 6,465,993 | B1 * | 10/2002 | Clarkin et al. | 323/272 |
| RE38,454 | E * | 3/2004 | Walters et al. | 323/272 |
| 6,836,103 | B2 * | 12/2004 | Brooks et al. | 323/282 |
| 6,853,169 | B2 * | 2/2005 | Burstein et al. | 323/272 |
| 7,009,370 | B2 * | 3/2006 | Deaton | 323/272 |
| 7,034,511 | B2 * | 4/2006 | Schuellein et al. | 323/272 |
| 7,084,613 | B2 * | 8/2006 | Harris et al. | 323/272 |

FOREIGN PATENT DOCUMENTS

| | | |
|---|---|---|
| EP | 1 248 354 | 10/2002 |
| FR | 2 829 312 | 3/2003 |

* cited by examiner

*Primary Examiner*—Shawn Riley

(74) *Attorney, Agent, or Firm*—Peter Zawilski

(57) ABSTRACT

An increasing number of phases in multiphase converters causes an increase in requirements with respect to the control IC. According to the present invention, instead of deriving a new PWM signal for every single phase of the DC-DC converter, the single phases are clustered into groups (22, 24, 26). Within each group, the converters are operated on the basis of one PWM signal (PW M1, PW M2 . . . PW MN). Advantageously, this may allow to reduce the requirements with respect to the control IC and thus may allow the application of cheaper and smaller control ICs.

9 Claims, 1 Drawing Sheet

MULTI-PHASE DC-DC CONVERTER WITH SHARED CONTROL

Figure 1:
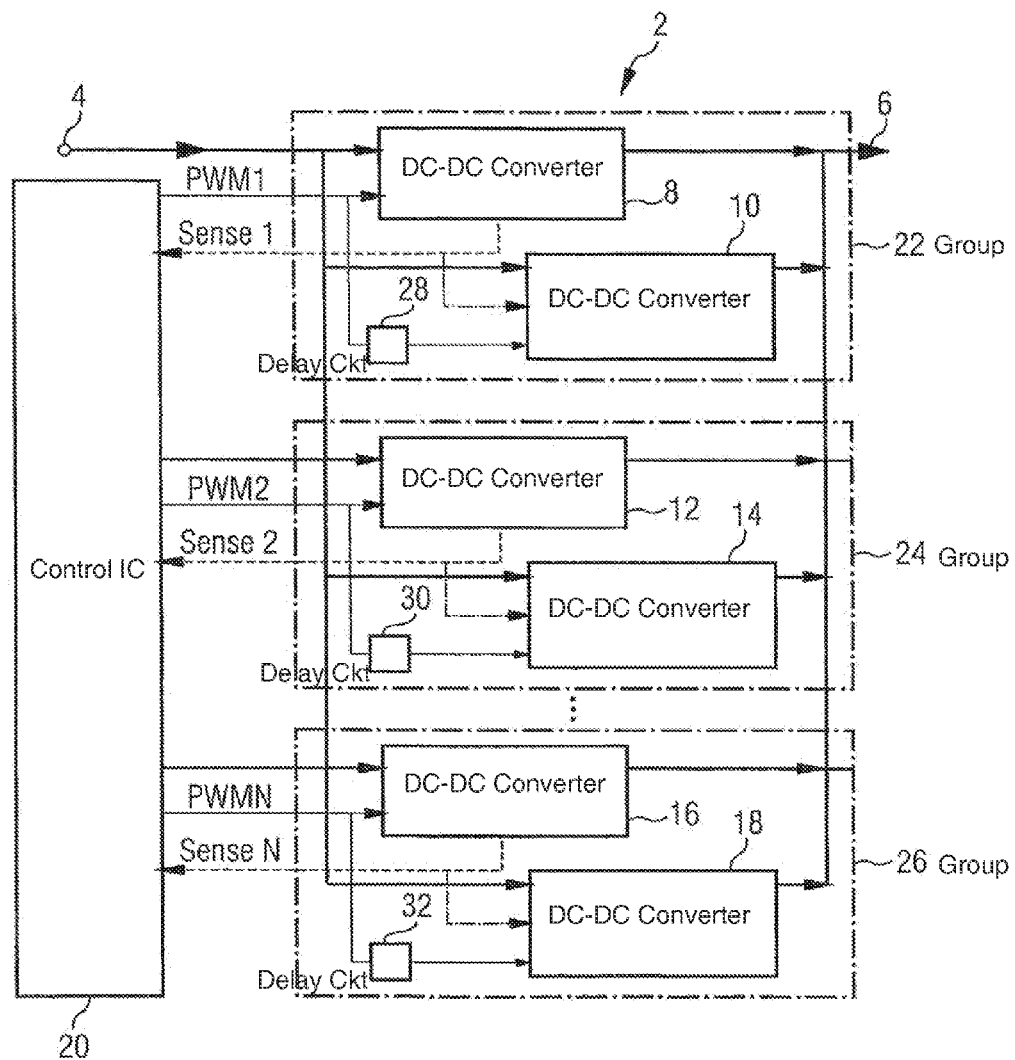

The present invention is generally related to the field of power conversion and control and, more particularly, is related to a multiphase DC-DC converter device and method.

Various DC-DC converters, such as switch mode power converter circuits, are known in the art, including, amongst others, buck and boost converters. Buck converters operate to step down a direct current (DC) voltage from one level to another lower level, while boost converters operate to step up a DC voltage from one level to a higher level. These converter circuits are well known and are relatively simple and operate at high efficiency, but they are limited in power handling capacity, due to the ratings of the solid state switching devices used, such as field effect transistors (FETs) and insulated bipolar gate transistors (IBGTs). For this reason, operation at high power levels may require that multiple switching devices are operated in parallel. Similarly, the inductors required are easy to produce and more economical in smaller sizes, so that it is common practice to use both paralleled switching devices and parallel inductors in converter circuits, designed to operate at relatively high power levels. While this parallel operation of components allows operation at the desired high power levels, it does nothing to reduce the high level of ripple current in voltage produced at the input and output terminals of these converters.

EP 1 248 354 A1 discloses a multiphase converter with balanced currents including a plurality of converter channels. Each converter channel comprises one converter. Each converter is provided with its own respective PWM signal, generated by a control circuit. The control circuit includes a plurality of control circuit channels, each of which corresponds to a converter channel.

Such known multiphase converters may allow to reduce the output voltage ripple under steady state conditions. Thus, the number of output capacitors necessary to filter the output signals of such converters might be reduced. The phase shift between the different phases, i.e. the different channels of such DC-DC converters may also lead to smaller ripples at the inputs of the converter, and thus smaller and cheaper filters may be provided at the inputs.

Due to increasing load requirements for the DC-DC converters, for example, a load current of high speed digital ICs, such as high performance Pentium processors for PCs, may increase up to almost 100 A at 1,0 to 1,5 Volts, there is a trend to share the currents between an increasing number of phases. Assuming a current level of 10 to 15 A per phase, DC-DC converters need eight to ten phases to satisfy such power demands.

However, with the increase of the number of phases of the DC-DC converter, the requirements with respect to the control IC become greater and greater, due to the fact that more and more PWM signals and sense signals are needed for the increasing number of phases.

It is an object of the present invention to provide for a simple and efficient DC-DC conversion.

According to an exemplary embodiment of the present invention, this object may be solved by a multiphase DC-DC converter device, as set forth in claim 1, comprising a control circuit generating a first control signal and a second control signal. Furthermore, there is provided a first group of converters, comprising a plurality of first converters and a second group of converters, comprising a plurality of second converters. The first group of converters is provided with the first control signal, such that the plurality of first converters is operated on the basis of the first control signal and the second group of converters is provided with the second control signal, such that the plurality of second converters is operated on the basis of the second control signal.

In other words, according to this exemplary embodiment of the present invention, instead of deriving a new control signal, such as a PWM signal, for every single phase of the DC-DC converter, the phases are clustered into groups. According to an aspect of this exemplary embodiment of the present invention, each group uses one control signal, i.e. in case the control signal is a PWM signal, only one PWM signal. Advantageously, this allows to simplify the requirements for the control circuit, which may allow for the provision of smaller and cheaper control circuits. Furthermore, the multiphase DC-DC converter device according to this exemplary embodiment of the present invention, advantageously allows for a sharing of load currents across several phases, i.e. several converters of the DC-DC converter device and allows for an introduction of phase differences between the groups of converters to minimize input ripples. This may allow to use smaller and cheaper filters. These advantages, according to an aspect of this exemplary embodiment of the present invention, may be obtained by using only a simple control IC, for example, by using a three phase controller IC for a nine phase system, wherein the nine phases are clustered into three groups.

According to another exemplary embodiment of the present invention as set forth in claim 2, at least one of the first converters of the first group is provided with a delay circuit for time delaying the first control signal and at least one of the second converters is provided with a second delay circuit for time delaying the second control signal. Thus, according to this exemplary embodiment of the present invention, converters of the first and second group may be provided with respectively delayed control signals, whereas other converters of the first and second converters are provided with the undelayed control signals. In other words, in each group there is a converter, which is provided with a direct control signal without time delay. This is a directly controlled phase of the respective group. For the non-directly controlled phases or converters of the respective group, i.e. those converters provided with a time delayed control signal, a phase shift may be introduced by controlling or setting the respective delay time.

According to another exemplary embodiment of the present invention as set forth in claim 3, each of the non-directly controlled phases or converters of a group is provided with a delay circuit, such that a different time delay is introduced into the control signal for each of these non-directly controlled converters. Advantageously, this may allow for a greater number of phases, while keeping the requirements for the control IC low.

According to another exemplary embodiment of the present invention as set forth in claim 4, a duty cycle of a PWM signal of the first control signal is adapted on the basis of a first sense signal of a directly controlled converter of the first group. Advantageously, due to the fact that according to this exemplary embodiment of the present invention, only a reduced number of sense signals is used to adjust a duty cycle of a PWM signal of a first control signal for a plurality of converters of the same group, the requirements for the control IC or for the control circuit may be kept low, while allowing for a controlled current sharing.

According to another exemplary embodiment of the present invention, the first and second converters are boost converters, buck converters or buck-boost or forward converters or flyback converters.

According to another exemplary embodiment of the present invention as set forth in claim 6, a method is provided for performing a DC-DC conversion. According to this exemplary embodiment of the present invention, a first group of converters, including a plurality of converters and a second group of converters comprising a plurality of converters are respectively provided with a first control signal and a second control signal. According to an aspect of this exemplary embodiment of the present invention, all the converters in each group are controlled on the basis of the same control signal.

Advantageously, this may allow for a very simple and efficient DC-DC conversion, requiring only a minimal number of control signals, such as, for example, PWM signals.

Claims 7 to 9 provide for further exemplary embodiments of the exemplary embodiment of the method according to the present invention as set forth in claim 6.

It may be seen as the gist of an exemplary embodiment of the present invention that, instead of deriving a new control signal, such as a PWM signal, for every single phase of a DC-DC converter, the single phases of the DC-DC converter are clustered into groups. All phases within a group are controlled on the basis of the same control signal. According to an aspect of the present invention, the non-directly controlled phases may be controlled by using a time delayed version of the control signal of the respective group. Furthermore, for a better current sharing, sense signals from the directly controlled phases, i.e. the phases receiving the control signal without time delay, may be used to respectively adapt, for example, a duty cycle of the non-directly controlled phases.

These and other aspects of the present invention will become apparent from and elucidated with reference to the embodiments described hereinafter.

Exemplary embodiments of the present invention will be described in the following, with reference to the following drawing:

FIG. 1 shows a simplified schematic representation of an exemplary embodiment of a multiphase DC-DC conversion device according to the present invention.

FIG. 1 shows a simplified schematic representation of an exemplary embodiment of a DC-DC converter 2 according to the present invention. In spite of the fact that the converters of this exemplary embodiment are buck converters, the present invention may also be practiced with other suitable converters such as boost converters or buck-boost or forward converters or flyback converters. Reference numeral 4 in FIG. 1 designates an input terminal of the multiphase DC-DC converter 2 according to an exemplary embodiment of the present invention, which receives the input signal, i.e. the input voltage from an input filter, which is not shown in FIG. 1. Reference numeral 6 designates the output of the multiphase DC-DC converter 2. Reference numerals 8, 10, 12, 14, 16 and 18 designate single phase DC-DC converter devices, such as buck converters. The input of each of the converters 8, 10, 12, 14, 16 and 18 is connected to the input terminal 4. The output of each of the converters 8, 10, 12, 14, 16 and 18 is connected to an output terminal to form the output 6. The converters 8, 12 and 16 are directly controlled converters representing directly controlled phases of the DC-DC converter 2. Each of the directly controlled converters 8, 12 and 16 is provided with an individual PWM signal, PWM 1, PWM 2 and PWM N. Each of the directly controlled converters 8, 12 and 16 is adapted to control its output voltage and/or current on the basis of the respective PWM signal, PWM 1, PWM 2, PWM N. Buck converters are sufficiently known in the art, such that a detailed description of the operation of converters may be omitted here.

Furthermore, as may be taken from FIG. 1, a sense signal Sense 1, Sense 2 and Sense N is taken from each of the directly controlled converters 8, 12 and 16 and fed into a control IC 20. These sense signals, Sense 1, Sense 2 and Sense N are used to adjust the respective control signals, PWM 1, PWM 2 and PWM N in order to achieve an equal current sharing among the individual converters 8, 12, and 16.

The voltage at the output 6 is controlled or regulated by the control IC 20 by controlling the duty-cycles of the PWM . . . PWM N signals.

In FIG. 1, the directly controlled converter 8 and a non-directly controlled converter 10 form a first group 22. A non-directly controlled converter represents a non-directly controlled phase of the DC-DC converter 2.

The non-directly controlled converter 10 receives the same control signal PWM 1 as the directly controlled converter 8. However, in contrast to the directly controlled converter 8, the non-directly controlled converter 10 receives the PWM 1 signal with a time delay introduced by a delay circuit 28. In other words, in the non-directly controlled phase, a corresponding time delay is introduced in the control signal PWM 1 to obtain a phase shift between the directly controlled converter 8 and the non-directly controlled converter 10. Furthermore, as may be taken from FIG. 1, there is no sense signal taken from the non-directly controlled converter 10 and fed into the control IC 20. Instead, the sense signal Sense 1 from the directly controlled converter 8 may be used for controlling the duty cycle of the time delayed control signal PWM 1, supplied 20, to the non-directly controlled converter 10 in order to control the current sharing between the phases within this group.

Furthermore, there is provided another group 24, comprising the directly controlled converter 12 and the non-directly controlled converter 14, receiving the control signal PWM 2 with a time delay introduced by delay circuit 30. As in group 22, the sense signal Sense 2 of the directly controlled converter 12, which is fed into the control IC 20, may be used to control a duty cycle of the time delayed control signal PWM 2 supplied to the non-directly controlled converter 14. In the case of group 22, the time delay introduced by delay circuit 30 allows to obtain a phase shift between the converters.

Furthermore, there is provided a group 26, comprising the directly controlled converter 16, of which the sense signal Sense N is input to the control IC 20. Sense N may also be used to control a duty cycle of the PWM N signal provided to the non-directly controlled converter 18. For this, the control IC 20 may be adapted to adjust the duty cycle of the respective PWM signal PWM 1, PWM 2, PWM N on the basis of the respective sense signal Sense 1, Sense 2, Sense N. Also, there is provided a delay circuit 32 for time delaying the control signal PWM N.

As indicated by the dots between groups 24 and 26, the present invention is not limited to a certain number of groups of converters. Instead, the present invention may be applied to DC-DC converter devices comprising two or more converter groups. Furthermore, according to an aspect of the present invention, not only one non-directly controlled converter may be provided for each directly controlled converter, but a plurality of non-directly controlled converters may be provided for each directly controlled converter. For example, three, four, five or more non-directly controlled converters may be provided for each directly controlled converter. Thus, for example, in case there are three groups, each group comprising one directly controlled converter and two non-directly controlled converters, a nine phase system can be built by using a three phase controller IC.

As may be taken from FIG. 1, according to an aspect of the present invention, a plurality of converters of the multiphase DC-DC converter 2 are combined to a group, which is operated on the basis of the same control signals PWM 1 . . . N. One converter, referred to as directly controlled converter of each group, is operated on the basis of the non-time delayed control signals PWM 1 . . . N. The remaining converters of each group are also operated on the basis of this control signal PWM 1 . . . N, however, in contrast to the directly controlled converter, the control signal PWM 1 . . . N is provided to these non-directly controlled converters with a time delay introduced by delay circuits 28, 30, 32. By controlling these time delays introduced by the delay circuits 28, 30, 31, phase shifts with respect to the respectively controlled converter of each group, may be controlled. Thus, by controlling the phase shifts between the control signals PWM 1 . . . . N, i.e. by controlling the respectively introduced time delays, the phases of the converters 8, 10, 12, 14, 16 and 18 may be controlled such that they each operate at a difference phase. Preferably, the phases of the respective converters are controlled such that the phase difference between all the converters is equal. Accordingly, due to the fact that only a reduced number of control signals PWM 1 . . . N is needed. Thus, the requirements for the control IC 20 are significantly reduced, and smaller and cheaper control ICs 20 may be used. Furthermore, according to the present invention, a load current sharing across several phases may be achieved. Furthermore, phase differences may be introduced into the control signals PWM 1 . . . N or by the delay circuits 28, 30 and 32 to minimize input and output ripples. This may allow for cheaper input and output filter arrangements. Due to this, the DC-DC converter device 2, as set forth according to this exemplary embodiment of the present invention, may in particular be suitable for high load currents of high speed digital ICs, such as high performance Pentium processors for PCs, where the load current may reach up to 100 A.

The invention claimed is:

1. Multiphase DC-DC converter device, comprising:—a control circuit generating a first control signal and a second control signal;—a first group of DC-DC converters comprising a plurality of first DC-DC converters and a second group of DC-DC converters comprising a plurality of second DC-DC converters;—wherein the first group of DC-DC converters is provided with the first control signal such that the plurality of first DC-DC converters is operated on the basis of the first control signal and the second group of DC-DC converters is provided with the second control signal such that the plurality of second DC-DC converters is operated on the basis of the second control signal.

2. The multiphase DC-DC converter device of claim 1,—wherein at least one third converter of the plurality of first DC-DC converters is provided with a first delay circuit for time-delaying the first control signal; and—wherein at least one fourth converter of the plurality of second DC-DC converters is provided with a second delay circuit for time-delaying the second control signal.

3. The multiphase DC-DC converter device of claim 2,—wherein a plurality of the third DC-DC converters is respectively provided with first delay circuits, wherein the time-delays introduced by the first delay circuits with respect to the first control signal are different for each of the first delay circuits;—wherein the time-delays introduced by the first delay circuits correspond to desired phase shifts of the first control signal such that the plurality of first DC-DC converters are respectively operated at different phases of the first control signal;—wherein a plurality of the fourth DC-DC converters is respectively provided with second delay circuits, wherein the time-delays introduced by the second delay circuits with respect to the second control signal are different for each of the second delay circuits; and—wherein the time-delays introduced by the second delay circuits correspond to desired phase shifts of the second control signal such that the plurality of second DC-DC converters are respectively operated at different phases of the second control signal.

4. The multiphase DC-DC converter device of claim 2,—wherein a duty cycle of a PWM signal of the first control signal is adapted by the control circuit on the basis of a first sense signal of a fifth converter of the first group of DC-DC converters; and wherein the fifth converter is provided with the undelayed first control signal.

5. The multiphase DC-DC converter device of claim 1,—wherein the plurality of first and second DC-DC converters are selected from the group consisting of boost DC-DC converters, buck DC-DC converters, buck-boost DC-DC converters, forward DC-DC converters and flyback DC-DC converters.

6. A method of performing a DC-DC conversion, the method comprising the steps of:—generating a first control signal and a second control signal in a control circuit;—providing a first group of DC-DC converters with the first control signal such that a plurality of first DC-DC converters of the first group of DC-DC converters is operated on the basis of the first control signal; and—providing a second group of DC-DC converters with the second control signal such that a plurality of second DC-DC converters of the second group of DC-DC converters is operated on the basis of the second control signal.

7. The method of performing a DC-DC conversion of claim 6,—wherein at least one third converter of the plurality of first DC-DC converters is provided with a time-delayed first control signal; and—wherein at least one fourth converter of the plurality of second DC-DC converters is provided with a time-delayed second control signal.

8. The method of performing a DC-DC conversion of claim 7, further comprising the steps of:—introducing time delays into the first control signal of a plurality of the third DC-DC converters, wherein the time-delays introduced in the first control signal are different for each of the plurality of third DC-DC converters;—wherein the time-delays introduced in the first control signal correspond to desired phase shifts of the first control signal such that the first DC-DC converters are respectively operated at different phases of the first control signal; and—introducing time delays into the second control signal of a plurality of the fourth DC-DC converters, wherein the time-delays introduced in the second control signal are different for each of the plurality of fourth DC-DC converters;—wherein the time-delays introduced in the second control signal correspond to desired phase shifts of the second control signal such that the second DC-DC converters are respectively operated at different phases of the second control signal.

9. The method of performing a DC-DC conversion of claim 6,—wherein a duty cycle of a PWM signal of the first control signal is adapted on the basis of a first sense signal of a fifth converter of the plurality of first DC-DC converters; and—wherein the fifth converter is provided with the undelayed first control signal.

* * * * *